United States Patent
Dagdeviren et al.

(10) Patent No.: US 7,356,095 B2
(45) Date of Patent: Apr. 8, 2008

(54) HYBRID DATA RECOVERY SYSTEM

(75) Inventors: Nuri R. Dagdeviren, Holmdel, NJ (US); Erol Eryilmaz, Holmdel, NJ (US)

(73) Assignee: Agere Systems Inc., Allentown, PA (US)

( * ) Notice: Subject to any disclaimer, the term of this patent is extended or adjusted under 35 U.S.C. 154(b) by 842 days.

(21) Appl. No.: 10/323,103

(22) Filed: Dec. 18, 2002

(65) Prior Publication Data

US 2004/0120426 A1    Jun. 24, 2004

(51) Int. Cl.
    *H03D 1/00*    (2006.01)
(52) U.S. Cl. .................................. 375/340
(58) Field of Classification Search ............. 375/150, 375/343, 354, 362, 340
    See application file for complete search history.

(56) References Cited

U.S. PATENT DOCUMENTS

| | | | | |
|---|---|---|---|---|
| 4,339,823 A | * | 7/1982 | Predina et al. .............. | 375/294 |
| 5,297,164 A | * | 3/1994 | McCabe ..................... | 375/224 |
| 6,055,436 A | * | 4/2000 | Powell et al. ............... | 455/503 |
| 6,349,121 B1 | | 2/2002 | Anderson ................... | 375/317 |
| 6,433,899 B1 | | 8/2002 | Anslow et al. .............. | 359/110 |
| 6,459,727 B1 | | 10/2002 | Cho et al. ................... | 375/222 |
| 6,472,918 B1 | | 10/2002 | Mosinskis et al. .......... | 327/175 |
| 6,570,916 B1 | * | 5/2003 | Feldbaumer et al. ........ | 375/232 |
| 6,980,586 B1 | * | 12/2005 | Ballinger .................... | 375/150 |
| 2003/0081697 A1 | * | 5/2003 | Little ......................... | 375/317 |

FOREIGN PATENT DOCUMENTS

GB    1 205 471 A    9/1970
GB    2 118 005 A    10/1983

OTHER PUBLICATIONS

"IEEE 100, The Authoritative Dictionary of IEEE Standards Terms" Seventh Edition, IEEE Press Publication, 2000, p. 346.*
"Clock Recovery From Random Binary Signals," by J. D. H. Alexander, Electronic Letters, vol. 11, pp. 541-542, Oct. 1975.

* cited by examiner

*Primary Examiner*—Khai Tran
(74) *Attorney, Agent, or Firm*—Steve Mendelsohn

(57) ABSTRACT

In a data recovery circuit, multiple slicer outputs of incoming data for each data bit, e.g., one or more slicer outputs taken at or near the center of the eye and one or more slicer outputs taken at or near the leading edge and/or trailing edge of the eye, are processed in a manner that reduces the bit-error rate relative to the prior art. The data recovery circuit may be combined with state-of-the-art clock recovery circuits to yield improved clock and data recovery (CDR) circuits.

22 Claims, 9 Drawing Sheets

| Col# | 1 | 2 | 3 | 4 | 5 | 6 | 7 | 8 | 9 | 10 |
|---|---|---|---|---|---|---|---|---|---|---|
| Row # | SOD (Sb) | SOE (Sb) | SOD (Sa) | SOE (Sa) | Transition n-1 to n? | Transition n to n+1? | n | Comment | Confidence Weight | Confidence Value |
| 1 | 0 | 0 | 0 | 0 | 0 to 0 | 0 to 0 | 0 | 0-0-0 | High | 1 |
| 2 | 0 | 0 | 0 | 1 | 0 to 0 | Yes | 0 | 0-0-1 | High | 1 |
| 3 | 0 | 0 | 1 | 0 | 0 to 0 | Inconsistent | 0 | ? | Low | 0 |
| 4 | 0 | 0 | 1 | 1 | 0 to 0 | 1 to 1 | 0 | Contradict | Low | 0 |
| 5 | 0 | 1 | 0 | 0 | Yes | 0 to 0 | 0 | 1-0-0 | High | 1 |
| 6 | 0 | 1 | 0 | 1 | Yes | Yes | 0 | Need more info | Low | 0 |
| 7 | 0 | 1 | 1 | 0 | Yes | Invalid | 0 | Need more info | Low | 0 |
| 8 | 0 | 1 | 1 | 1 | Yes | 1 to 1 | 1 | 0-1-1 | High | 1 |
| 9 | 1 | 0 | 0 | 0 | Inconsistent | 0 to 0 | 0 | ? | Low | 0 |
| 10 | 1 | 0 | 0 | 1 | Inconsistent | Yes | 0 | Need more info | Low | 0 |
| 11 | 1 | 0 | 1 | 0 | Inconsistent | Inconsistent | 0 | Inconsistent | Low | 0 |
| 12 | 1 | 0 | 1 | 1 | Inconsistent | 1 to 1 | 1 | ? | Low | 0 |
| 13 | 1 | 1 | 0 | 0 | 1 to 1 | 0 to 0 | 0 | Contradict | Low | 0 |
| 14 | 1 | 1 | 0 | 1 | 1 to 1 | Yes | 1 | 1-1-0 | High | 1 |
| 15 | 1 | 1 | 1 | 0 | 1 to 1 | Inconsistent | 1 | ? | Low | 0 |
| 16 | 1 | 1 | 1 | 1 | 1 to 1 | 1 to 1 | 1 | 1-1-1 | High | 1 |

TABLE 3

FIG. 4

TABLE 4 (b)

FIG. 5 (b)

TABLE 4 (a)

FIG. 5 (a)

| Row # | SOA (Sm) | SOB (Sm) | SOC (Sm) | SOD (Sb) | SOE (Sb) | SOD (Sa) | SOE (Sa) | SDO (n) |
|---|---|---|---|---|---|---|---|---|
| 65 | 1 | 0 | 0 | 0 | 0 | 0 | 0 | 0 |
| 66 | 1 | 0 | 0 | 0 | 0 | 0 | 1 | 0 |
| 67 | 1 | 0 | 0 | 0 | 0 | 1 | 0 | 0 |
| 68 | 1 | 0 | 0 | 0 | 1 | 1 | 1 | 0 |
| 69 | 1 | 0 | 0 | 0 | 1 | 0 | 0 | 0 |
| 70 | 1 | 0 | 0 | 0 | 1 | 0 | 1 | 0 |
| 71 | 1 | 0 | 0 | 1 | 1 | 1 | 0 | 1 |
| 72 | 1 | 0 | 0 | 1 | 0 | 0 | 1 | 0 |
| 73 | 1 | 0 | 0 | 1 | 0 | 0 | 0 | 0 |
| 74 | 1 | 0 | 0 | 1 | 0 | 1 | 1 | 0 |
| 75 | 1 | 0 | 0 | 1 | 1 | 1 | 0 | 0 |
| 76 | 1 | 0 | 0 | 1 | 1 | 0 | 1 | 1 |
| 77 | 1 | 0 | 1 | 0 | 0 | 0 | 0 | 0 |
| 78 | 1 | 0 | 1 | 0 | 0 | 0 | 1 | 1 |
| 79 | 1 | 0 | 1 | 0 | 0 | 1 | 0 | 0 |
| 80 | 1 | 0 | 1 | 0 | 1 | 1 | 1 | 0 |
| 81 | 1 | 0 | 1 | 0 | 1 | 1 | 0 | 0 |
| 82 | 1 | 0 | 1 | 0 | 1 | 0 | 1 | 0 |
| 83 | 1 | 0 | 1 | 0 | 0 | 1 | 0 | 0 |
| 84 | 1 | 0 | 1 | 1 | 1 | 1 | 1 | 0 |
| 85 | 1 | 0 | 1 | 1 | 1 | 0 | 0 | 0 |
| 86 | 1 | 0 | 1 | 1 | 1 | 0 | 1 | 0 |
| 87 | 1 | 0 | 1 | 1 | 0 | 1 | 0 | 1 |
| 88 | 1 | 0 | 1 | 1 | 0 | 1 | 1 | 0 |
| 89 | 1 | 0 | 1 | 1 | 0 | 0 | 0 | 0 |
| 90 | 1 | 0 | 1 | 1 | 0 | 0 | 1 | 0 |
| 91 | 1 | 0 | 1 | 1 | 1 | 1 | 0 | 0 |
| 92 | 1 | 0 | 1 | 1 | 1 | 0 | 1 | 0 |
| 93 | 1 | 0 | 1 | 1 | 1 | 1 | 0 | 1 |
| 94 | 1 | 0 | 1 | 1 | 0 | 0 | 1 | 0 |
| 95 | 1 | 0 | 1 | 1 | 0 | 1 | 0 | 1 |
| 96 | 1 | 0 | 1 | 1 | 0 | 1 | 1 | 1 |

TABLE 4 (c)

FIG. 5 (c)

| Row # | SOA (Sm) | SOB (Sm) | SOC (Sm) | SOD (Sb) | SOE (Sb) | SOD (Sa) | SOE (Sa) | SDO (n) |
|---|---|---|---|---|---|---|---|---|
| 97 | 1 | 1 | 0 | 0 | 0 | 0 | 0 | 0 |
| 98 | 1 | 1 | 0 | 0 | 0 | 0 | 1 | 0 |
| 99 | 1 | 1 | 0 | 0 | 0 | 1 | 0 | 0 |
| 100 | 1 | 1 | 0 | 0 | 0 | 1 | 1 | 0 |
| 101 | 1 | 1 | 0 | 0 | 1 | 1 | 0 | 0 |
| 102 | 1 | 1 | 0 | 0 | 1 | 0 | 1 | 0 |
| 103 | 1 | 1 | 0 | 0 | 1 | 0 | 0 | 0 |
| 104 | 1 | 1 | 0 | 1 | 1 | 1 | 1 | 1 |
| 105 | 1 | 1 | 0 | 1 | 0 | 0 | 0 | 0 |
| 106 | 1 | 1 | 0 | 1 | 0 | 0 | 1 | 0 |
| 107 | 1 | 1 | 0 | 1 | 0 | 1 | 0 | 0 |
| 108 | 1 | 1 | 0 | 1 | 0 | 1 | 1 | 0 |
| 109 | 1 | 1 | 0 | 1 | 1 | 1 | 0 | 0 |
| 110 | 1 | 1 | 0 | 1 | 1 | 0 | 1 | 1 |
| 111 | 1 | 1 | 1 | 0 | 0 | 0 | 0 | 0 |
| 112 | 1 | 1 | 1 | 0 | 0 | 0 | 1 | 1 |
| 113 | 1 | 1 | 1 | 0 | 0 | 1 | 0 | 0 |
| 114 | 1 | 1 | 1 | 0 | 1 | 1 | 1 | 0 |
| 115 | 1 | 1 | 1 | 0 | 1 | 1 | 0 | 0 |
| 116 | 1 | 1 | 1 | 0 | 0 | 0 | 1 | 0 |
| 117 | 1 | 1 | 1 | 0 | 0 | 1 | 0 | 1 |
| 118 | 1 | 1 | 1 | 1 | 1 | 1 | 1 | 0 |
| 119 | 1 | 1 | 1 | 1 | 1 | 1 | 0 | 0 |
| 120 | 1 | 1 | 1 | 1 | 0 | 0 | 1 | 0 |
| 121 | 1 | 1 | 1 | 1 | 0 | 1 | 0 | 1 |
| 122 | 1 | 1 | 1 | 1 | 0 | 1 | 1 | 1 |
| 123 | 1 | 1 | 1 | 1 | 1 | 0 | 0 | 1 |
| 124 | 1 | 1 | 1 | 1 | 1 | 0 | 1 | 1 |
| 125 | 1 | 1 | 1 | 1 | 1 | 1 | 0 | 1 |
| 126 | 1 | 1 | 1 | 1 | 1 | 0 | 1 | 1 |
| 127 | 1 | 1 | 1 | 1 | 1 | 1 | 0 | 1 |
| 128 | 1 | 1 | 1 | 1 | 1 | 1 | 1 | 1 |

TABLE 4 (d)

FIG. 5 (d)

```
line  /* begin procedure */
 1    k = 1;
 2    for (i = 1 to 8) {
 3      for (j = 1 to 16) {
 4        n_k = n_w(Sm)_i + n_w(Sab)_j   /* add estimates */
 5        If (n_k > 0) then n_k = 1, else n_k = 0;  /* map to binary result */
 6        k = k + 1;                      /* increment k */
 7      } /* end for j */
 8    } /* end for i */
      /* end procedure */
```

FIG. 6

HYBRID DATA RECOVERY SYSTEM

BACKGROUND OF THE INVENTION

1. Field of the Invention

The invention relates to clock and data recovery systems used in high-speed optical and electronic receivers and, more specifically, to slicing techniques for data recovery.

2. Description of the Related Art

High-speed (e.g., 2.5-3.125 Gb/s) serial links are commonly used in optical communication links or for chip-to-chip interconnects in high-speed systems. For example, synchronous optical network (SONET) OC-192 links generate a 10-Gbps serial data stream on the optical links as well as its electrical representation just prior to the laser of the transmitter and after the optical detector of the receiver. At these speeds, optical dispersion phenomena (e.g., chromatic or polarization mode dispersion), electrical dispersion due to the frequency attenuation characteristics of the electrical interconnect, clock jitter, interference, and optical and electrical noise tend to corrupt the signals being transmitted, making their recovery difficult.

Typically, receivers in such systems attempt to slice a serial data signal at the center of symbol intervals since this is where the data integrity (i.e., signal-to-noise ratio) is generally best and the setup and hold times of the data signal to the slicer elements will be maximized. For example, in a 10-Gbps system, the symbol intervals are roughly 100 ps and the center slicing point would be roughly 50 ps from either the prior or subsequent anticipated symbol transition points for a given bit of the serial data signal. A slicer (i.e., effectively a one-bit analog-to-digital converter (ADC)) determines whether the sampled data is above or below a given threshold voltage. The threshold voltage is generally set midway between the voltage representing a logic "0" and the voltage representing a logic "1" for a given logic family (e.g., TTL or ECL). However, as will be discussed in the present invention, certain advantages can be drawn from placing thresholds at locations other than the mid point between the logical 1 and 0 values.

Alternatively, multiple distinct slicers can be utilized to sample the data signal at the center of symbol intervals. For example, two additional slicers can be employed with their respective thresholds set at, for example, roughly 25% and 75% of the range between voltages representing a logic "0" and a logic "1" for the system. Other slicer thresholds are also possible as well as different numbers of slicers. Alternatively, instead of multiple slicers (i.e., single-bit ADCs), a higher-order ADC of two or more bits can be used to sample data streams. As the number of bits in the ADC, or equivalently the number of slicers, increases, there is generally an increased system price to be paid in terms of chip area, power consumption, and/or temporal sampling accuracy. As a result, such samplers are generally undesirable in high-speed data recovery systems and one must resort to the absolute minimum number of slicers to achieve reliable detection.

Another technique to improve performance of data recovery in high-speed systems is oversampling. In an oversampling system, more than one sample per symbol interval is taken. Such samplers may take two, three, or more samples per symbol interval to improve the confidence level of each sample. By oversampling the input signal and then digitally processing the resulting digital samples, errant samples due to noise can be rejected, and improved recovery can be accomplished. However, straight oversampling comes at the cost of increased power consumption.

SUMMARY OF THE INVENTION

To address the above-discussed deficiencies of the prior art, one embodiment of the present invention includes a data recovery circuit employing five distinct slicers of the incoming data, three at the center of the "eye" and two at the edge of the "eye" in an eye diagram of the incoming data. Combinations of slicer outputs and computed data values are processed in a weighted voting arrangement and adjusted dynamically in a manner that minimizes the bit-error rate of the data recovery relative to the prior art. The data recovery circuit of this invention may be combined with state-of-the-art clock recovery circuits to yield improved clock and data recovery (CDR) circuits. Advantages of the present invention with respect to oversampling schemes include utilization of different numbers of slicers at different sampling phases to minimize the power consumption of the implementation circuit, and maximization of the information obtained at the output of the slicers by (1) application of different slicer thresholds at different sampling phases and (2) careful matching of slicing times to the phase of the incoming signal.

One embodiment of this invention is a method of recovering data from a received data signal that includes slicing the received data signal substantially at edges of symbol intervals using a first set of one or more slicer thresholds to generate edge samples, slicing the received data signal substantially at centers of the symbol intervals using a second set of one or more slicer thresholds to generate center samples, and determining values for the data bits in the received data signal based on the edge samples and the center samples.

Another embodiment of this invention is an apparatus for recovering data from a received data signal. The apparatus includes a set of slicers adapted to (i) slice the received data signal substantially at edges of symbol intervals using a first set of one or more slicer thresholds to generate edge samples, and (ii) slice the received data signal substantially at centers of the symbol intervals using a second set of one or more slicer thresholds to generate center samples. It also includes a logic block adapted to determine values for the data bits in the received data signal based on the edge samples and the center samples.

Yet another embodiment of this invention is a method of synchronizing a locally generated clock used to process a received data signal. The method involves slicing the received data signal substantially at edges of symbol intervals using a first set of one or more slicer thresholds to generate edge samples, slicing the received data signal substantially at centers of the symbol intervals using a second set of one or more slicer thresholds to generate center samples, and adjusting at least one of the phase and the frequency of the locally generated clock based on the edge samples and the center samples.

Yet another embodiment of this invention is an apparatus for synchronizing a locally generated clock used to process a received data signal. The apparatus includes a set of slicers adapted to (i) slice the received data signal substantially at edges of symbol intervals using a first set of one or more slicer thresholds to generate edge samples, and (ii) slice the received data signal substantially at centers of the symbol intervals using a second set of one or more slicer thresholds to generate center samples. It further includes a logic block adapted to adjust at least one of the phase and the frequency of the locally generated clock based on the edge samples and the center samples.

BRIEF DESCRIPTION OF THE DRAWINGS

Other aspects, features, and advantages of the present invention will become more fully apparent from the following detailed description, the appended claims, and the accompanying drawings in which:

FIG. 4 depicts TABLE 3, which summarizes one interpretation of edge slicer outputs.

FIG. 5 depicts TABLE 4, which summarizes the logic implemented in slicer logic 212 of FIG. 2.

FIG. 6 shows pseudo-code for the procedure used to calculate the data in the last column of TABLE 4.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Data Recovery

Figure 1:
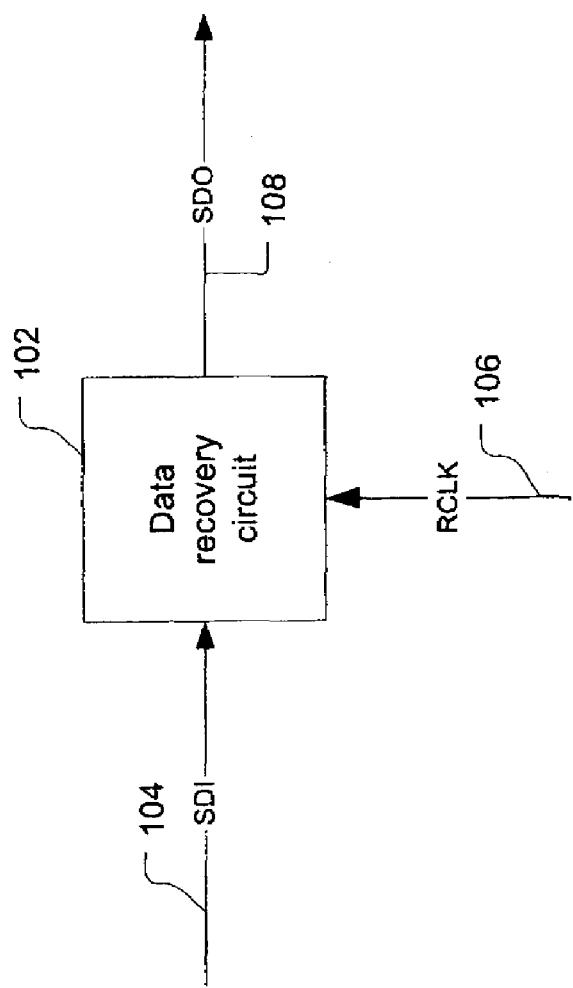
FIG. 1 is a block diagram illustrating a data recovery circuit of a high-speed data receiver, in accordance with one embodiment of the present invention.

FIG. 1 is a block diagram illustrating a data recovery circuit (DRC) of a high-speed data receiver, in accordance with one embodiment of the present invention. As shown, DRC 102 is fed by both serial data input (SDI) 104 and receive clock (RCLK) 106, and outputs serial data out (SDO) 108. Note that, depending on the particular implementation, the signals in and out of DRC 102 may be differential or non-differential and may correspond to any given logic family (e.g., CMOS, TTL, ECL). As is typical for a synchronous system, RCLK 106 may be supplied by a transmitter along with SDI 104. Alternatively, in an asynchronous implementation, RCLK 106 may be derived locally from SDI 104 via a clock recovery circuit. As discussed previously, there are a number of approaches to implementing the data recovery function illustrated in FIG. 1. According to certain embodiments of the present invention, a combination of distinct slicers of the incoming data is employed, as discussed in the following sections.

Five-slicer Data Recovery Circuit

Figure 2:
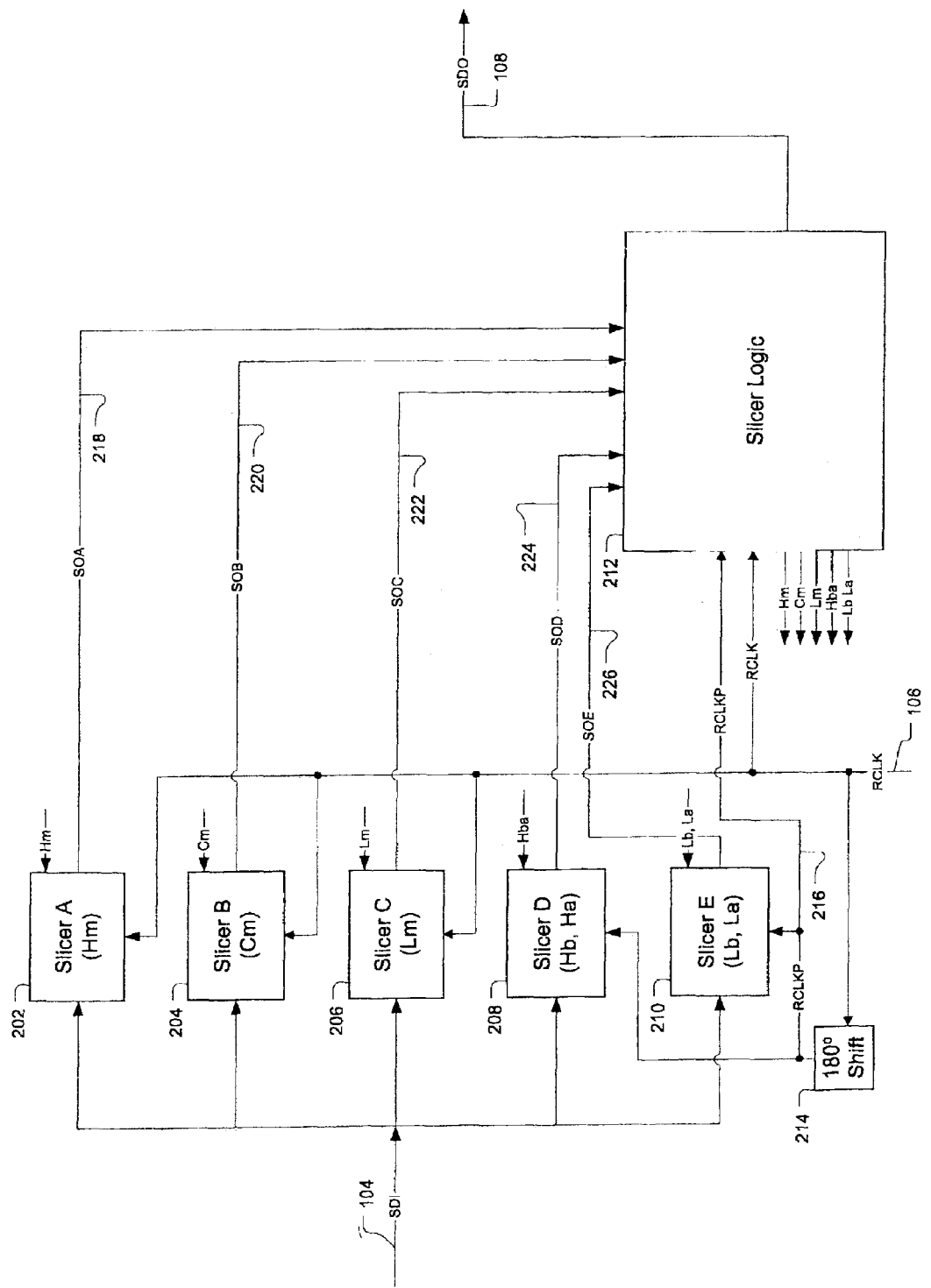
FIG. 2 is a block diagram illustrating a five-slicer embodiment of the data recovery circuit of FIG. 1.

The data recovery block diagram of FIG. 2 illustrates one embodiment of the present invention. As shown, this embodiment employs five distinct slicers (i.e., voltage comparators). In particular, SDI 104 feeds all five slicers 202 through 210 in parallel. RCLK 106 feeds the first three slicers 202-206, slicer logic 212, and phase shift circuit 214. Phase shift circuit 214 phase shifts RCLK 106 by 180 degrees (i.e., by ½ the period of RCLK 106) to produce RCLKP 216, which then feeds the last two slicers 208 and 210 as well as slicer logic 212. Slicer logic 212 additionally receives the outputs of the five slicers, namely SOA 218, SOB 220, SOC 222, SOD 224, and SOE 226, and uses them to produce output SDO 108. Each of these elements is discussed in more detail in the following sections.

Slicers

Each of slicers 202 through 210 performs a voltage comparison between the serial data input signal SDI 104 and a slicer-specific voltage threshold. If, at the time the slicer samples signal SDI, the voltage associated with signal SDI is greater than the slicer-specific threshold voltage, then the slicer outputs a logical "1." Otherwise, the slicer outputs a logical "0."

The first three slicers 202, 204, and 206 perform their voltage comparisons at a point in time corresponding to the center of the data eye (i.e., substantially halfway between two consecutive data transitions) associated with SDI 104 by slicing at the rising edge of RCLK 106.

The last two slicers 208 and 210 perform their voltage comparisons at a point in time corresponding to the edge of the data eye associated with SDI 104 by slicing at the rising edge of the phase-shifted receive clock RCLKP 216.

Figure 3:
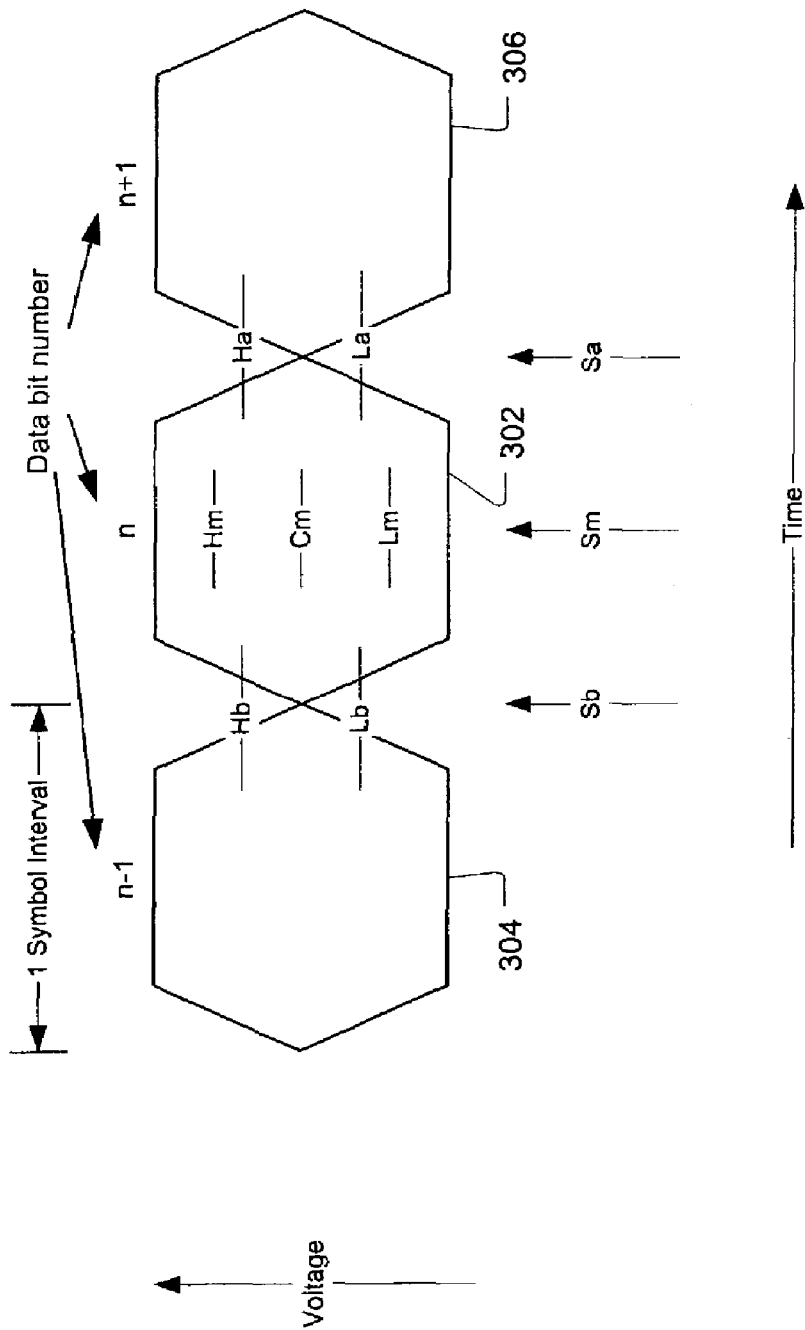
FIG. 3 is an eye diagram illustrating the timing and threshold voltages for the slicers of FIG. 2.

Details of the timing and thresholds associated with slicers 202 through 210 of FIG. 2 are illustrated in FIG. 3, which depicts, among other things, an eye diagram spanning three symbol intervals of SDI 104, as might be displayed on an oscilloscope monitoring the input data stream and having its retrace period set to 3 symbol intervals. Each data eye corresponds to a bit of the serial data stream SDI 104. The first data bit, n−1, corresponds to data eye 304, the second data bit, n, corresponds to data eye 302, and the third data bit, n+1, corresponds to data eye 306.

Referring to both FIG. 2 and FIG. 3, at sample time Sm, where the "m" denotes "middle," slicer A 202 compares the voltage of SDI 104 with threshold Hm, slicer B 204 compares the voltage of SDI 104 with threshold Cm, and slicer C 206 compares the voltage of SDI 104 with threshold Lm. Note that the designations "Hm," "Cm," and "Lm" were chosen as convenient mnemonics for these three thresholds, which can be interpreted as "high" threshold at the "middle" sample, "center" threshold at the "middle" sample, and "low" threshold at the "middle" sample, respectively. The resulting Boolean outputs of these three slicers may be denoted by SOA(Sm), SOB(Sm), and SOC(Sm), respectively.

At sample time Sb (where "b" denotes "before"), slicer D 208 compares the voltage of SDI 104 with "high" threshold Hb and slicer E 210 compares the voltage of SDI 104 with "low" threshold Lb.

During each symbol interval, the five slicers generate decision values, starting with slicers 208 and 210 at sample time Sb followed by slicers 202, 204, and 206 at sample time Sm.

Sample time Sm corresponds to a rising edge of RCLK 106, while sample times Sa and Sb correspond to rising edges of RCLKP 216. Sb corresponds to a rising edge of RCLKP that is "before" Sm, and Sa corresponds to a rising edge of RCLKP 216 that is "after" Sm. Note that sample time Sa for data bit n is equivalent to sample time Sb for data bit n+1.

The threshold values will depend on the logic family being used and the application. For example, threshold Cm, roughly corresponding to the center point between logic high and logic low for a given implementation's logic family, may be set lower for a 3.3V CMOS logic system than it would be set for a 5V TTL system. On the other hand, when the receiver is used in an optical link that includes dispersion resulting in a distorted eye diagram as well as asymmetric noise in the optical domain, it may be advantageous to place Cm off-set from the middle point of the eye diagram. Depending on the performance of the system, the known statistics of the transmission medium and the characteristics of the transmitter and receiver, the thresholds can be adjusted independently by the system in time and voltage in either an a priori or a dynamic fashion to minimize system bit-error rate and to optimize detection accuracy.

For this embodiment, it is assumed that the threshold values are roughly as depicted in FIG. 3 relative to the switching rails of the logic family, that Hb is equal to Ha (since they represent the same threshold, Ha merely depicting the threshold Hb taken on the subsequent cycle), and that Lb is equal to La. However, there is no requirement of equivalence between Hb (or equivalently Ha) and for example Hm, nor is there a restriction against equivalence of those thresholds. Similarly, there is no requirement of equivalence between Lb (or equivalently La) and Lm, nor is there a restriction against equivalence of those thresholds.

The threshold comparisons performed by slicers 202 through 210 resolve to true or false results depending on the data (represented by SDI 104), its noise characteristics, and the noise tolerance of the voltage comparison circuits of the slicers.

As for the accuracy of the timing of threshold comparisons, it is assumed for this embodiment that, whatever the source, clocks RCLK 106 and RCLKP 216 are sufficiently accurate such that the sampling times Sm, Sb, and Sa are substantially in the middle of, and at the edges before and after, respectively, data bit n, which the system is designed to recover.

Center-of-the-eye slicers

In the absence of noise, a mid-data or temporal "center-of-the-eye" threshold comparison, such as one taken at time Sm using voltage threshold Cm, should be sufficient to recover the data information of bit n of SDI 104 (as represented by the center eye 302 of the triple eye diagram of FIG. 3).

However, to improve data recovery performance in real-world (i.e., noisy) applications, additional comparisons at thresholds Hm and Lm are utilized. One interpretation or mapping of the outputs SOA(Sm), SOB(Sm), and SOC(Sm) of the three slicers 202, 204, and 206 corresponding to thresholds Hm, Cm, and Lm, respectively, is shown in TABLE 1. As indicated by TABLE 1, there are 8 possible combinations for the three threshold comparisons. These are listed in rows 1 through 8 of the table.

For an ideal signal, there are only two valid combinations, corresponding to rows 1 and 8 of TABLE 1. In row 1, all zeros in first three columns indicates that all three threshold comparisons SOA(Hm), SOB(Cm), and SOC(Lm) were FALSE. The computed data bit n is thus mapped according to the table to a logic "0" and the comment indicates that there is agreement from all three slicers that the computed data bit n should be interpreted as logic "0." Similarly, in row 8, all ones in columns 1-3 indicates that all three threshold comparisons were TRUE. The computed data bit "n" is thus mapped to a logic "1" and the comment indicates that there is agreement from all three slicers that the computed data bit n should be a "1." Note that in both cases where all three slicers are in agreement, a "confidence weight," column 6, of "high" is assigned.

All rows other than 1 and 8, exhibit some inconsistency with what would be expected from the three slicers in the presence of an ideal (i.e., noise-free) data signal. Rows 2 and 4 are self-consistent, although they leave some doubt in the computed data bit n values of "0" and "1," respectively. For example, it is possible to see the result of row 2 in a system with noise on the low rail of the switching system such that the Lm-threshold slicer 206 outputs a TRUE on SOC(Sm), when the data bit is low, hence the associated comment "noisy 0." Similarly, in row 4, noise may cause a FALSE output from the Hm-threshold slicer 202 indicating a "noisy 1." In these two cases, a confidence weight of medium is assigned indicating some uncertainty in the results, but a reasonable degree of confidence.

TABLE 1

| | Col # | | | | | | |
|---|---|---|---|---|---|---|---|
| | 1 | 2 | 3 | 4 | | 6 | 7 |
| | SOA | SOB | SOC | Computed | 5 | Confidence | Confidence |
| Row # | (Hm) | (Cm) | (Lm) | bit n | Comment | Weight | Value |
| 1 | 0 | 0 | 0 | 0 | Agreement on 0 | high | 1 |
| 2 | 0 | 0 | 1 | 0 | Noisy 0 - SOC | medium | 0.5 |
| 3 | 0 | 1 | 0 | 0 | Inconsistent SOB | low | 0 |
| 4 | 0 | 1 | 1 | 1 | Noisy 1 - SOA | medium | 0.5 |
| 5 | 1 | 0 | 0 | 0 | Inconsistent SOA | low | 0 |
| 6 | 1 | 0 | 1 | 1 | Inconsistent SOB | low | 0 |
| 7 | 1 | 1 | 0 | 1 | Inconsistent SOC | low | 0 |
| 8 | 1 | 1 | 1 | 1 | Agreement on 1 | high | 1 |

The remaining rows of TABLE 1, namely 3, 5, 6 and 7, represent contradictions, and it is difficult to draw an accurate conclusion as to what might be the actual data bit value that caused such results. An appropriate conclusion to draw in these cases is that the slicer threshold calibrations are no longer accurate and they should be re-calibrated. Nonetheless, TABLE 1 provides an interpretation of what the computed bit n might be for each case, given only the results of the three slicers 202, 204, and 206.

Edge-of-the-eye Slicers

Certain communications systems suffer more from noise corruption of the signal at the center of the eye, than at the edge of the eye. So, for example, a system that is so noisy that the eye diagram observed at the receiver appears to be "closed," may still be relatively clean at the edges of the eye. In such a system, it may be difficult to recover data by sampling at the center of the eye alone. However, by sampling in a particular manner at the edges of the eye, data recovery performance can be improved.

Referring again to FIGS. 2 and 3, one interpretation of the outputs SOD 224 and SOE 226 of the two edge slicers 208 and 210, corresponding to thresholds Hb and Lb (or, equivalently, to thresholds Ha and La), respectively, is shown in TABLE 2. In TABLE 2, columns 1 and 2 correspond to the possible values of outputs SOD 224 and SOE 226 of slicers 208 and 210 taken at one of the data sampling times at the edge of the eye (i.e., either Sb or Sa).

TABLE 2

| | Col | | |
|---|---|---|---|
| Row | 1<br>SOD | 2<br>SOE | 3<br>Transition? |
| 1 | 0 | 0 | No |
| 2 | 0 | 1 | Yes |
| 3 | 1 | 0 | Inconsistent |
| 4 | 1 | 1 | No |

For example, for sample time Sb, TABLE 2 represents possible samples at the edge between bits n−1 and n of the triple-eye diagram of FIG. 3. In particular, in the absence of noise, rows 1 and 4 correspond to situations in which no transition occurs between bit n−1 and bit n. In row 1, both bit n−1="0" and bit n="0," while, in row 4, both bit n−1="1" and bit n="1." Row 2 corresponds to situations in which a transition occurs, but more information is needed to determine whether the transition is from bit n−1="0" to bit n="1," or from bit n−1="1" to bit n="0." Row 3 corresponds to the internally inconsistent case where the voltage as measured by the slicers is both above high threshold Hb and below low threshold Lb. In this case, it is not known whether or not a transition occurred and an appropriate conclusion to draw is that thresholds should be re-calibrated.

Since row 1 indicates persistence of the logic state of "0" from bit n−1 to bit n, in this case, a value for data bit n of "0" can be determined solely from the two edge slicers sampling at time Sb. Similarly, in the case of row 4, a value for data bit n of "1" can be determined solely from the two edge slicers sampling at time Sb.

If TABLE 2 is assumed to represent the outputs of slicers 208 and 210 at sample time Sa, analogous interpretations of transitions (and data values) exist, where transitions are between bit n and bit n+1 instead of between bit n−1 and bit n.

Putting two instances of TABLE 2 together, one representing sample time Sb and one representing sample time Sa, provides some additional information. Such a table, illustrated by TABLE 3 of FIG. 4, includes (i) first and second columns representing outputs SOD 224 and SOE 226 of slicers 208 and 210 of FIG. 2 at sampling time Sb and (ii) third and fourth columns representing outputs of slicers 208 and 210 at sampling time Sa. Columns 5 and 6 of TABLE 3 document the state transitions implied by the edge slicer outputs which correspond to sample times Sb and Sa, respectively.

For example, in row 1, SOD(Sb)="0" and SOE(Sb)="0" implies persistence of the logic value of "0" from data bit n−1 to data bit n. This is represented by the "0 to 0" entry in column 5 of that row. Similarly, in the same row, SOD(Sa)="0" and SOE(Sa)="0" implies persistence of the logic value of "0" from data bit n to data bit n+1. This is represented by the "0 to 0" entry in column 6 of that row. Here, the results of the edge slicers at two different sample times, Sb and Sa, concur that data bit n is a "0." This is noted in column 7 under the label n. Finally, this concurrence is scored 1 in the last column under the label "confidence value."

The rest of the rows are completed in similar fashion taking into account the interpretations already discussed with respect to TABLE 2.

Note that, while the inconsistent entry of row 3 of TABLE 2 appears in rows 3, 7, 9-12, and 15 of TABLE 3, additional inconsistent scenarios are exhibited by TABLE 3. For example, in the case of row 4, columns 1 and 2 imply a value of "0" for both bits n−1 and n, while columns 3 and 4 imply a value of "1" for both bits n and n+1. Both conclusions cannot be correct, leading to a contradiction in slicer results. A similar contradiction exists in the case of row 13. In this embodiment, such cases are equally likely a "1" or a "0." As such, a value of "0" may be arbitrarily chosen for the "computed n" entry in column 7, and a 0 assigned as a "confidence value" in the last column.

As another example, columns 1 and 2 of row 3 imply a value of "0" for both bits n−1 and n, while columns 3 and 4 represent an inconsistent combination of slicer outputs. Since sample SOE(Sa)="0" is consistent with both samples SOD(Sb) and SOE(Sb), it is assumed that sample SOD(Sa) is in error. (Note that other interpretations are possible.) Thus a "computed n" value of "0" is assigned in column 7, with an assigned "confidence value" of 0 in the last column.

It is clear from TABLES 1, 2, and 3 that, in a non-ideal world, neither a pure center-of-the-eye sampling technique nor a pure edge-of-the-eye sampling technique is sufficient to resolve very noisy data with complete accuracy. However, combining the techniques can yield a significant improvement in the accuracy of the data recovery process as well as a means to tailor the data recovery circuit's strengths to the characteristics of the received data.

Combining Center-of-the-eye and Edge-of-the-eye Slicers

Depending on the implementation, in the data recovery circuit of FIG. 2, the five slicer outputs 218 through 226 can be combined in slicer logic circuit 212 in many different ways, and over multiple sample times. Additionally, adjusting the relative thresholds of the five slicers, and using different weighting schemes to calculate the different mappings of the slicer output values, represents a virtually infinite spectrum of different implementations that can be employed given the statistics of the communication system. As suggested previously, this can be handled statically via a priori setting of the thresholds, or it can be handled dynamically via bit-error-rate analysis. In one possible embodiment, slicer logic circuit 212 implements the logic of TABLE 4 of FIG. 5.

In TABLE 4, the columns labeled SOA(Sm), SOB(Sm), and SOC(Sm) correspond to possible inputs to slicer logic circuit 212 from slicers 202, 204, and 206 of FIG. 2 at a rising edge of RCLK 106 corresponding to the sample time Sm of FIG. 3. The columns labeled SOD(Sb) and SOE(Sb) correspond to possible inputs to slicer logic circuit 212 from slicers 208 and 210 of FIG. 2 at the rising edge of RCLKP 216 corresponding to time Sb of FIG. 3, and the columns labeled SOD(Sa) and SOE(Sa) correspond to possible inputs to slicer logic circuit 212 from slicers 208 and 210 at the rising edge of RCLKP 216 corresponding to time Sa of FIG. 3. The column labeled SDO(n) corresponds to the output SDO 108 of slicer logic block 212 for the nth bit, given the corresponding inputs to slicer logic 212.

For example, in row 5, the first three entries, "0," "0, " and "0," under the headings SOA(Sm), SOB(Sm), and SOC(Sm), in isolation from the rest of the entries, imply a high confidence estimate of the value for bit n of "0," as discussed previously in relation to TABLE 1. Entries 4 and 5 of the same row, under the headings SOD(Sb) and SOE(Sb) indicate a transition, but are not specific about the value for n, as discussed previously in relation to TABLE 2. Entries 6 and 7, under the headings SOD(Sa) and SOE(Sa), however, indicate strongly that data bit n and n+1 are both "0," and thus are in concurrence with entries 1, 2, and 3. The overall selection of "0" for this scenario is indicated by the entry of "0" for SDO(n).

A similar analysis has been done for each of the other rows of TABLE 4. Note that, in preferred implementations, it is the Boolean logic corresponding to the mapping represented by the truth table of TABLE 4 that is implemented by slicer logic 212 of FIG. 2 and not the computational circuitry or analysis method used to derive the mapping. However, as discussed previously, it is possible within slicer logic 212 to support multiple mappings, which are dynamically selected in response to changes in the statistics of the receiver. Note that slicer logic 212 also includes appropriate registers (not shown) to synchronize and store the inputs from slicers 202-206, which arrive at time Sm, and slicers 208-210, which arrive at times Sa and Sb, so that they can be processed in parallel according to the Boolean logic of TABLE 4.

Note that the mapping of the values of the seven columns to the computed n value in the last column is preferably determined a priori by an algorithm or strategy. This strategy takes into account the statistics of the system and the relative voltages of the thresholds in the context of those statistics. Although the mapping is typically not computed "on-the-fly" during execution of the receiver, different mappings may be "switched in" dynamically to the receiver for real-time execution, corresponding to varying statistics of the receiver or dynamic modification made by the receiver to the threshold values. The mapping represented by TABLE 4 is exemplary. Other mappings could be used with a different probability of error in data recovery.

Note, as discussed previously, the thresholds Hm, Cm, Lm, Ha, and La can be adjusted to affect the relative probability for a given outcome of the corresponding slicers 202 through 210 given a particular set of statistics for the received data.

Deriving the Mappings

Figures 5A, 5B:
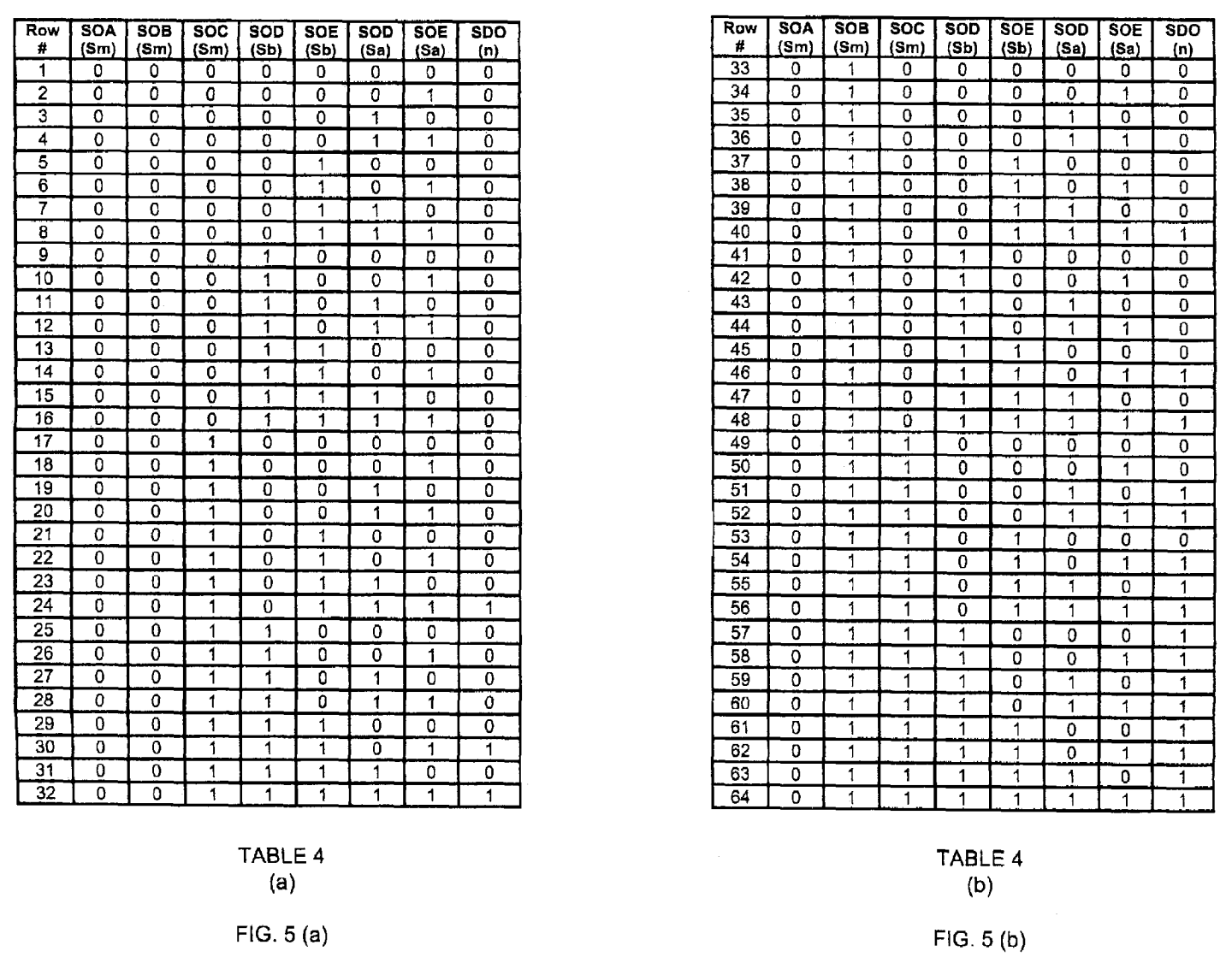

In one embodiment of the present invention represented by FIGS. 2 and 3 and TABLE 4 of FIG. 5, a couple of steps are taken to derive the values for SDO(n) in TABLE 4. First, a weighted center-of-the-eye estimate $n_w(Sm)_i$ is calculated for each of the 8 permutations in TABLE 1 according to Equation (1) as follows:

$$n_w(Sm)_i = (2*n1_i - 1)*CW1_i \quad (1)$$

where $CW1_i$ is the numerical "confidence value" from column 7, row i of TABLE 1 (where high=1, medium=0.5, low=0), and $n1_i$ is the value of n from column 4, row i of TABLE 1. Next, a weighted transition estimate $n_w(Sab)_j$ is calculated for each of the 16 permutations in TABLE 3 according to Equation (2) as follows:

$$n_w(Sab)_j = (2*n3_j - 1)*CW3_j \quad (2)$$

where $CW3_j$ is the "confidence value" from column 10, row j of TABLE 3 (where a consistent result is mapped to a numerical confidence value of 1 and an inconsistent result is mapped to a numerical confidence value of 0), and $n3_j$ is the value of n from column 7, row j of TABLE 3. Finally, the values $n_k$ for SDO(n) in TABLE 4 are calculated according to the procedure of FIG. 6.

According to that procedure, in line 1, the index k is initialized to 1. In line 2, an outer for-loop is entered, where i is initialized to 1 with a terminal count of 8. In line 3, an inner for-loop is entered, where j is initialized to 1 with a terminal count of 16. In line 4, a sum of the weighted estimates $n_w(Sm)_i$ of Equation (1) and the weighted estimate $n_w(Sab)_j$ of Equation (2) is calculated. In line 5, a threshold test maps any result greater than zero to a logic value of "1," while anything less than or equal to zero is mapped to a logical "0." In line 6, k is incremented by 1. In line 7, after 16 iterations of lines 4 through 6 of the procedure, the inner for-loop completes for the first time and control returns to the outer for-loop at line 2. The procedure within the outer for-loop (including the inner for-loop) is executed 7 additional times and then, in line 8, the outer for-loop completes after all 128 values for $n_k$ have been computed.

As an example, in row 1 of TABLE 1, the case of SOA(Sm)=0, SOB(Sm)=0, and SOC(Sm)=0 was assigned a confidence value of 1, and, in row 4 of TABLE 3, the case of SOD(Sb)=0, SOE(Sb)=0, SOD(Sa)=1, and SOE(Sa)=1 was assigned a confidence value of 0. These sample values correspond to row 4 of TABLE 4. According to Equation (1), $$n_w(Sm)_1 = (2*n1_1 - 1)*CW1_1 = (2*0 - 1)*1 = -1.$$

According to Equation (2), $$n_w(Sab)_4 = (2*n3_4 - 1)*CW3_4 = (2*0 - 1)*0 = 0.$$

According to line 4 of FIG. 6, $$n_4 = n_w(Sm)_1 + n_w(Sab)_4 = -1 + 0 = -1.$$

Applying line 5 of FIG. 6, since −1 is not greater than zero, then $n_4=0$.

As another example, in row 8 of TABLE 4, the values for SOA(Sm), SOB(Sm), and SOC(Sm) correspond to bit n="0" with a confidence value of 1, as discussed previously in relation to TABLE 1. Meanwhile, the values for SOD(Sb), SOE(Sb), SOD(Sa), and SOE(Sa) correspond to bit n="1" with a confidence value of 1, as discussed previously in relation to TABLE 3. Applying the procedures of Equations (1) and (2) and line 4 of FIG. 6 yields $n_8=0$. Subjecting this value to the test of line 5 yields a logic value "0" for this scenario, as indicated in the last column of row 8 of TABLE 4.

As a final example, in row 20 of TABLE 4, the values for SOA(Sm), SOB(Sm), and SOC(Sm) correspond to a "noisy 0" for bit n with a confidence value of 0.5, as discussed previously in relation to TABLE 1. Meanwhile, the values for SOD(Sb), SOE(Sb), SOD(Sa), and SOE(Sa) represent a contradiction that is arbitrarily mapped to a "0" and has a confidence weight of 0, as discussed previously in relation to TABLE 3. Applying the procedures of Equations (1) and (2) and line 4 of FIG. 6 yields $n_{20}=-0.5$, which maps, in line 5, to a logical "0," as indicated by the entry in the last column of row 20 of TABLE 4.

Note that the confidence values from TABLES 1 and 3 as well as the procedure of FIG. 6 used to calculate the mapping of TABLE 4 represents only one exemplary set of values and one possible calculation procedure or strategy, which yields one particular mapping. Other weights and/or other procedures may be used to calculate mappings appropriate to different receiver operating conditions and the static or dynamic characteristics of the receiver and/or statistics of the transmission channel and receiver. Additionally, mappings can be dynamically chosen for use in slicer logic 212 based on real-time performance monitoring performed by the receiver.

Alternatives

The embodiments discussed thus far focused on combining slicer results from the center of the eye with slicer results from prior and subsequent edges of the eye for the data bit of interest (i.e., bit n). In general, it is possible to include any number of different combinations of slicer information taken at any number of different times before and/or after the data bit of interest in the logic used to estimate that data bit. This information includes, but is not limited to: (1) the value calculated for bit n−1, (2) the edge-of-the-eye slicer outputs SOD(Sb) and SOE(Sb) taken at sample time Sb, (3) the center-of-the-eye slicer outputs SOA(Sm), SOB(Sm), and SOC(Sm) taken at sample time Sm, (4) the edge-of-the-eye slicer outputs SOD(Sa) and SOE(Sa) taken at sample time Sa, and (5) the value calculated for bit n+1. In different implementations, different subsets of this information can be combined to determine the value for bit n. Moreover, different embodiments of the present invention may have different numbers of center-of-the-eye and edge-of-the-eye slicers, including one or more multi-bit slicers (i.e., higher-order ADCs). In some implementations, edge-of-the-eye information is used only for those cases where the center-of-the-eye information alone yields less than a specified level of confidence in the computed data bit n. Alternatively, in other implementations, center-of-the-eye information is used only for those cases where the edge-of-the-eye information alone yields less than a specified level of confidence in the computed data bit n.

Note that the truth table mapping of TABLE 4 is based on one particular assignment of weights for the center-of-the-eye and edge-of-the-eye slicer results. A different assignment of weights and/or a different method of calculation of the mapping might yield a different mapping with a different relative focus on center-of-the-eye information versus edge-of-the-eye information. These different weighting and/or mapping schemes can be used to accommodate different communication systems characteristics.

Another Five-slicer Embodiment

Figure 7:
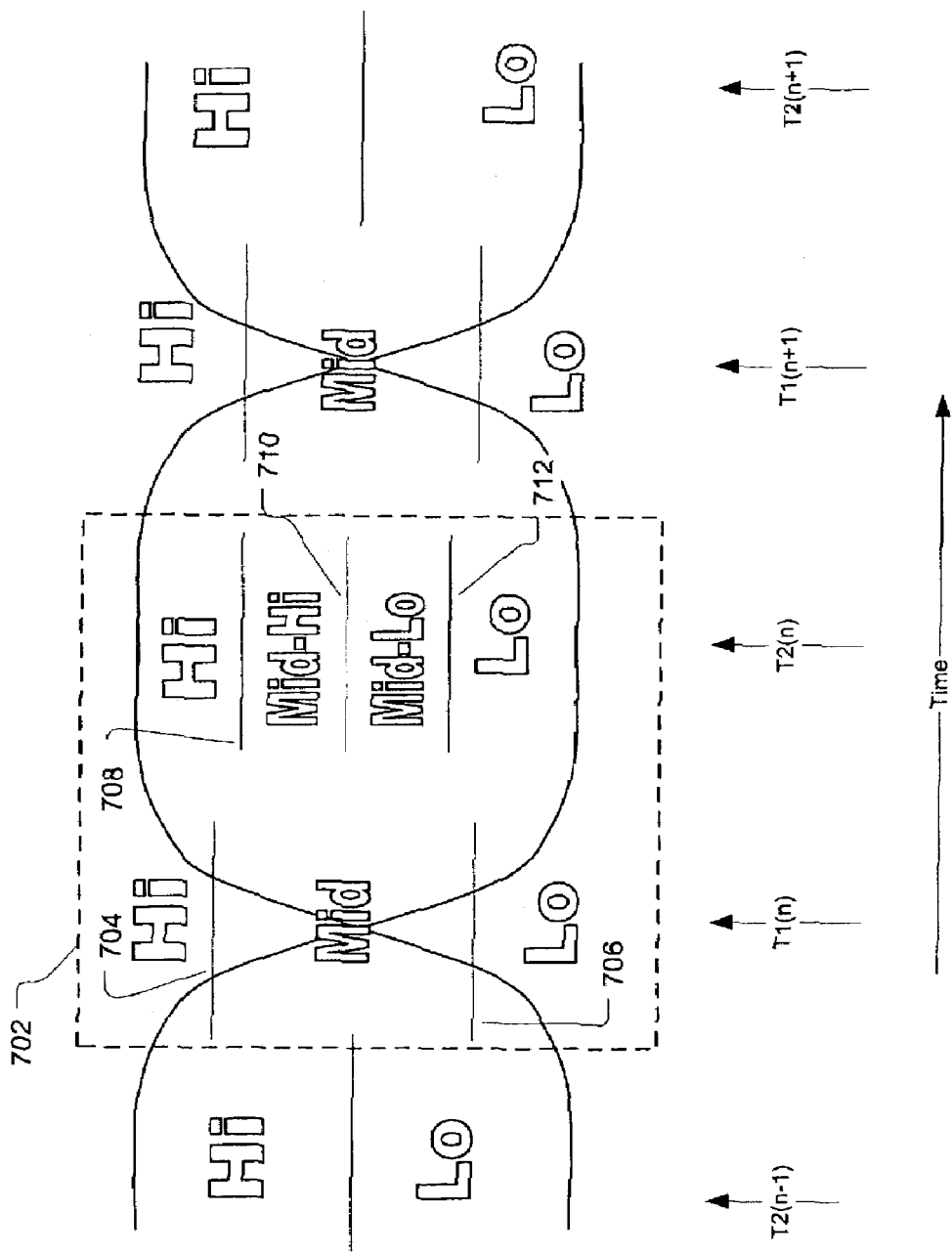
FIG. 7 is an eye diagram illustrating the timing, threshold voltages, and slicer results for another embodiment of the invention.

The triple eye diagram of FIG. 7 illustrates another exemplary embodiment of this invention. In this diagram, the thresholds, possible outcomes, and slicing times for various slicers are shown. These thresholds correspond to the thresholds of five unique slicers that are reused each cycle. Block 702 delineates the thresholds of the five slicers as applied during cycle n. The first two slicers use thresholds 704 and 706 at the leading edge of the n-th cycle at time T1(n), while the other three slicers use thresholds 708, 710, and 712 at the center of the eye of the n-th cycle at time T2(n). The outputs of these slicers are processed to eliminate contradicting results and yield a 2-tuple of values {V1(n), V2a(n)} corresponding to times T1(n) and T2(n), where V1(n) has a value of "Hi," "Mid," or "Lo," and V2a(n has a value of "Hi," "Mid-Hi," "Mid-Lo," or "Lo." V2a(n) is processed to yield V2b(n), where V2b(n) is assigned a value of "Hi" or "Lo" according to the following relationship:

If V2a(n) is "Hi" or "Mid-Hi," then V2b(n)="Hi,"

Else if V2a(n) is "Mid-Lo" or "Lo," then V2b(n)="Lo."

Appropriate values are stored so that, for cycle n, the following 5-tuple of values are available for processing {V2b(n−1), V1(n), V2a(n), V1(n+1), V2b(n+1)}, where these values correspond to the slicing times from FIG. 7 of T2(n−1), T1(n), T2(n), T1(n+1), and T2(n+1), respectively. Generally, in this embodiment, the output of the center-of-the-eye slicers at time T2(n) corresponding to the third element of the 5-tuple, V2a(n), is used independently of all other values to determine an output for bit n according to the mapping in TABLE 5 below.

TABLE 5

| V2a(n) | Bit (n) |
| --- | --- |
| Hi | 1 |
| Mid-Hi | 1 |
| Mid-Lo | 0 |
| Lo | 0 |

However, depending on the implementation, various combinations of the other values in the 5-tuple can be used to "override" this determination. In this example, contradictory cases have been ignored, but the valid combinations of the 5-tuple defined above that are used to override the mapping of TABLE 5 are captured in TABLE 6 below.

TABLE 6

| Row | V2b(n−1) | V1(n) | V2a(n) | V1(n+1) | V2b(n+1) | Bit (n) | Category |
| --- | --- | --- | --- | --- | --- | --- | --- |
| 1 | LO | MID | MID-LO | MID | LO | (ONE) | 1 |
| 2 | HI | HI | MID-LO | HI | HI | (ONE) | 1 |
| 3 | LO | MID | MID-LO | HI | HI | (ONE) | 1 |
| 4 | HI | HI | MID-LO | MID | LO | (ONE) | 1 |
| 5 | HI | MID | MID-HI | MID | HI | (ZERO) | 1 |
| 6 | LO | LO | MID-HI | LO | LO | (ZERO) | 1 |
| 7 | HI | MID | MID-HI | LO | LO | (ZERO) | 1 |
| 8 | LO | LO | MID-HI | MID | HI | (ZERO) | 1 |
| 9 | LO | HI | MID-LO | MID | LO | (ONE) | 2 |
| 10 | LO | MID | MID-LO | HI | LO | (ONE) | 2 |
| 11 | LO | HI | MID-LO | HI | HI | (ONE) | 2 |
| 12 | HI | HI | MID-LO | HI | LO | (ONE) | 2 |
| 13 | HI | LO | MID-HI | MID | HI | (ZERO) | 2 |
| 14 | HI | MID | MID-HI | LO | HI | (ZERO) | 2 |
| 15 | HI | LO | MID-HI | LO | LO | (ZERO) | 2 |
| 16 | LO | LO | MID-HI | LO | HI | (ZERO) | 2 |
| 17 | HI | LO | MID-HI | HI | HI | (ZERO) | 3 |
| 18 | HI | HI | MID-HI | LO | HI | (ZERO) | 3 |
| 19 | LO | LO | HI | LO | HI | (ZERO) | 3 |
| 20 | HI | LO | HI | LO | LO | (ZERO) | 3 |
| 21 | LO | MID | MID-HI | LO | HI | (ZERO) | 3 |
| 22 | HI | LO | MID-HI | MID | LO | (ZERO) | 3 |
| 23 | LO | HI | MID-LO | LO | LO | (ONE) | 3 |
| 24 | LO | LO | MID-LO | HI | LO | (ONE) | 3 |

TABLE 6-continued

| Row | V2b(n−1) | V1(n) | V2a(n) | V1(n+1) | V2b(n+1) | Bit (n) | Category |
|---|---|---|---|---|---|---|---|
| 25 | HI | HI | LO | HI | LO | (ONE) | 3 |
| 26 | HI | LO | LO | HI | HI | (ONE) | 3 |
| 27 | HI | MID | MID-LO | HI | LO | (ONE) | 3 |
| 28 | LO | HI | MID-LO | MID | HI | (ONE) | 3 |

Note that, in TABLE 6, each row is assigned to category 1, 2, or 3. These correspond to confidence levels associated with the "override" of the decision implied by the center-of-the-eye slicer. For example, in row 1, V2a(n) is Mid-Lo (a weak zero). In the absence of any other slicer information, this would be mapped to a bit value of zero. However, given that the other values in the 5-tuple all point to a bit value of one, the center-of-the-eye slicer is overridden. More specifically, the 5-tuple for row 1 is {Lo, Mid, Mid Lo, Mid, Lo}. These elements can be respectively interpreted as {bit n−1 is zero, a transition occurs, bit n is zero, a transition occurs, bit n+1 is zero}. Ignoring the "bit n is zero" information derived from the center-of-the-eye slicers, the rest of the 5-tuple suggests that the value for bit n should be a one. Similarly, the other category 1 5-tuples present high-confidence rationales for overriding the center-of-the-eye element. The first four rows are cases where a zero is overridden to a one and the next 4 rows are cases where a one is overridden to a zero.

Moving to category 2 5-tuples, there is again contradiction between the center-of-the-eye value and the others, but there is also some non-conformity between the non-center-of-the-eye elements that tends to weaken the argument for overriding the center-of-the-eye slicers. For example, the 5-tuple for row 9 is {Lo, Hi, Mid-Lo, Mid, Lo}. These elements can be respectively interpreted as {bit n−1 is zero, no transition occurs (or more specifically bit n−1 is one and bit n is also one), bit n is (weakly) zero, a transition occurs, bit n+1 is low}. Again ignoring the "bit n is (weakly) zero" information derived from the center-of-the-eye slicers, the first two elements are inconsistent, but the last two elements suggest strongly that the value for bit n should be a one. If you consider that the second element's value (Hi) is close to Mid, then all non-center-of-the-eye elements would argue for overriding the center-of-the-eye value and assigning bit n the value of one. Similar interpretations are made for the other category 2 5-tuples. Note that in both category 1 and 2 5-tuples, only weak ones (Mid-Hi) and weak zeros (Mid-Lo) are overridden, whereas in category 3 5-tuples, as discussed below, strong ones and zeros (V2a(n)=Hi and Low, respectively) are also overridden by non-center-of-the-eye elements that strongly agree to contradict the strong center-of-the-eye mapping.

As an example, the center-of-the-eye slicers in row 25 (category 3) strongly suggest a value for bit n of zero. However, the other elements strongly suggest the opposite. These two strong arguments create a near balance of confidence between the two opposing decision criteria. If the 5-tuple {Hi, Hi, Lo, Hi, Lo} is analyzed, it can be seen that the last two elements present some degree of inconsistency, tipping the scale in favor of the center-of-the-eye criterion. However, without a strong case for an override, this 5-tuple is categorized into the lowest confidence override group (3). Although it is dependent on the implementation, it is unlikely that in practice any of the category 3 tuples would be used to override the center-of-the-eye decision, but it is likely that category 1 and even 2 5-tuples would be used for override, especially in situations where the eye is closed or nearly closed.

Combined Clock and Data Recovery

Figure 8:
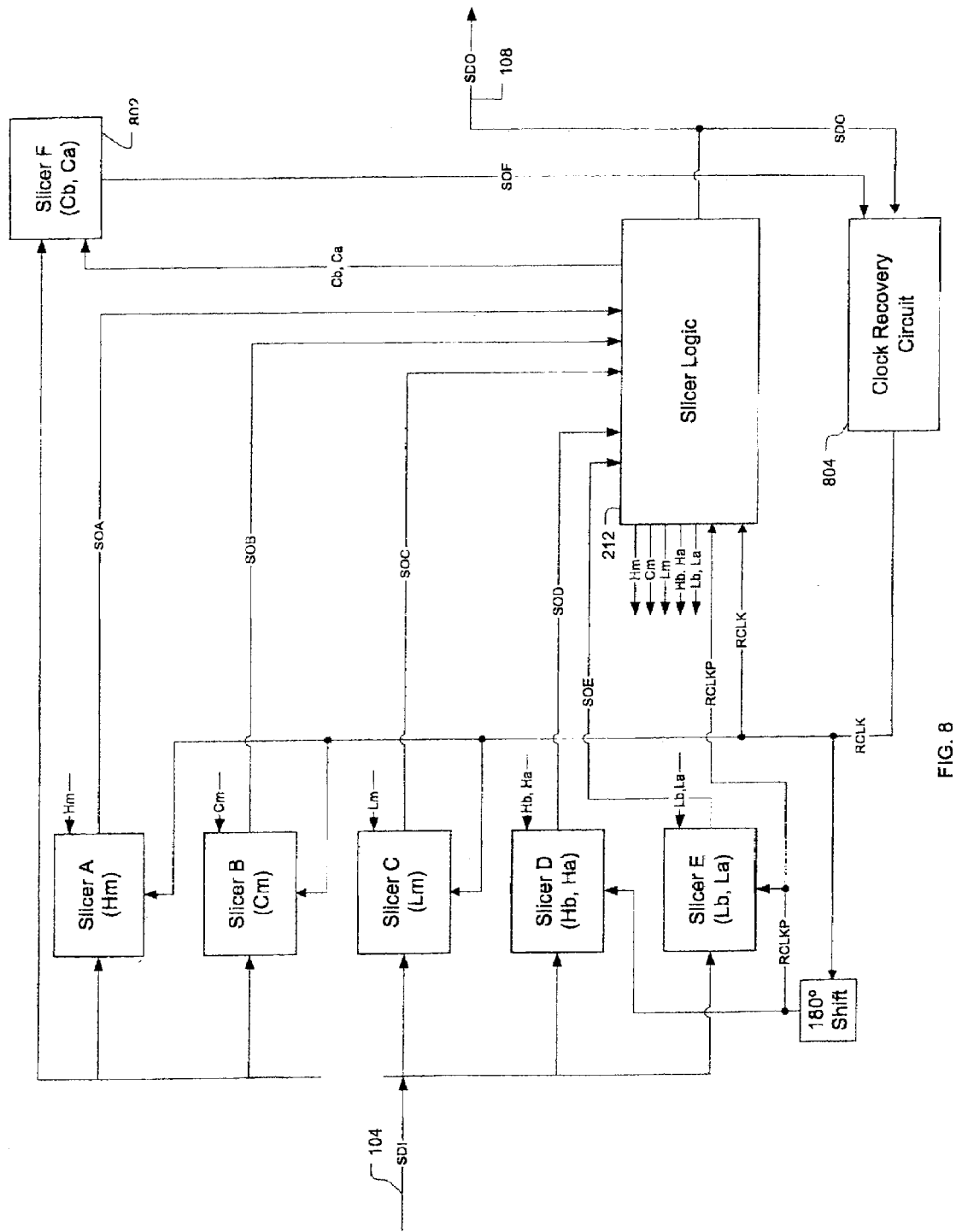
FIG. 8 is a block diagram of an embodiment of this invention that combines a state-of-the-art clock recovery circuit with the data recovery circuit of FIG. 2 to create a combined clock and data recovery circuit (CDR).

One embodiment of this invention combines a state-of-the-art clock recovery circuit with the data recovery circuit of FIG. 2 to create an improved clock and data recovery circuit (CDR) as depicted in FIG. 8.

In a typical implementation of a high-speed clock recovery circuit, center-of-the-eye and edge-of-the-eye slicer information is combined to characterize a locally synthesized (e.g., PLL based) clock as "early" or "late." This characterization is then used to update the phase (and in aggregate) the frequency of the local clock so that it tracks the clock inherent in the received data. One such technique used for this type of clock recovery is often referred to as "Alexander" (in honor of its recognized inventor—J. D. H. Alexander). More information can be found in Alexander, J. D. H, "Clock Recovery From Random Binary Signals," Electronic Letters, vol. 11, pp.541-542, October, 1975, incorporated by reference in its entirety.

In the embodiment of the invention illustrated by FIG. 8, additional mid-level edge-of-the-eye slicer (slicer F) 802 has been added along with clock recovery circuit 804 to the data recovery circuit of FIG. 2. Slicer F samples the data at the same time as slicers D and E (e.g., times Sb and Sa using FIG. 3 for reference) and passes its output SOF to clock recovery circuit 804. Clock recovery circuit 804 uses SOF in conjunction with the prior and current estimates of data bit n (received via interface SDO 108) to derive, via conventional (e.g., Alexander) means, early or late determinations. These early and late determinations are applied each cycle to a bang-bang phase detector and VCO/PLL circuit within clock recovery circuit 804 to effect phase and frequency tracking to the input data SDI. By combining the mid-level edge-of-the-eye slicer output SOF with the improved data estimates SDO that result from the processing of the other slicers, an improved clock recovery system is realized. This improvement is important in maintaining clock synchronization in cases of severe distortion where the eye-diagram is almost completely closed in the center of the eye. In this case, the output of slicer B alone is almost completely unreliable in identifying 0-1 or 1-0 transitions that the clock recovery circuit relies on.

Other ways of using the multiple slicers for phase estimation may also be possible. For example, during start-up, when the locally synthesized clock is only coarsely aligned, edge-of-the-eye slicer outputs can be exchanged logically with center-of-the-eye slicer outputs and some metric (e.g., bit error rate) can be compared between the two configurations. If the exchanged results are better than the non-exchanged results by some threshold of the metric, it may be assumed that a coarse adjustment of the local clock phase is required. The clock can either be coarsely adjusted in phase or the exchanged interpretation of the slicer outputs can be made the default recovery configuration until such time as another coarse adjustment is warranted by the metric computation and thresholding.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method of recovering data from a received data signal, the method comprising:
    slicing the received data signal substantially at edges of symbol intervals using a first set of one or more slicer thresholds to generate edge samples;
    slicing the received data signal substantially at centers of the symbol intervals using a second set of one or more slicer thresholds to generate center samples, wherein at least one of the first and second sets has two or more different slicer thresholds; and
    determining values for data bits in the received data signal based on the edge samples and the center samples.

2. The invention of claim 1, wherein the first and second sets of slicer thresholds are not identical.

3. The invention of claim 1, wherein:
    the edge samples comprise two slicer outputs taken substantially at a prior edge of each symbol interval and two slicer outputs taken substantially at a subsequent edge of each symbol interval; and
    the center samples comprise three slicer outputs taken substantially at the center of each symbol interval.

4. The invention of claim 3, wherein, for symbol interval n, the center samples further comprise a slicer output taken substantially at the center of symbol interval n−1 and a slicer output taken substantially at the center of symbol interval n+1.

5. The invention of claim 1, wherein the values for the data bits are determined using the edge samples and the center samples as inputs to a logic block that implements a mapping of different combinations of edge and center sample values to corresponding data bit values.

6. The invention of claim 5, wherein different mappings are dynamically selected for use in recovering the data.

7. The invention of claim 1, wherein each slicing of the received data signal is based on a specified threshold level.

8. The invention of claim 7, wherein at least one threshold level is dynamically adjusted.

9. The invention of claim 1, further comprising adjusting at least one of the phase and the frequency of a locally generated clock used to process the received data signal based on the edge samples and the center samples.

10. The invention of claim 1, wherein the number of slicer thresholds in the first set is different from the number of slicer thresholds in the second set.

11. An apparatus for recovering data from a received data signal, the apparatus comprising:
    (a) a set of slicers adapted to:
        (1) slice the received data signal substantially at edges of symbol intervals using a first set of one or more slicer thresholds to generate edge samples; and
        (2) slice the received data signal substantially at centers of the symbol intervals using a second set of one or more slicer thresholds to generate center samples, wherein at least one of the first and second sets has two or more different slicer thresholds; and
    (b) a logic block adapted to determine values for data bits in the received data signal based on the edge samples and the center samples.

12. The invention of claim 11, wherein the first and second sets of slicer thresholds are not identical.

13. The invention of claim 11, wherein:
    the edge samples comprise two slicer outputs taken substantially at a prior edge of each symbol interval and two slicer outputs taken substantially at a subsequent edge of each symbol interval; and
    the center samples comprise three slicer outputs taken substantially at the center of each symbol interval.

14. The invention of claim 13, wherein, for symbol interval n, the center samples further comprise a slicer output taken substantially at the center of symbol interval n−1 and a slicer output taken substantially at the center of symbol interval n+1.

15. The invention of claim 11, wherein the values for the data bits are determined using the edge samples and the center samples as inputs to a logic block that implements a mapping of different combinations of edge and center sample values to corresponding data bit values.

16. The invention of claim 15, wherein different mappings are dynamically selected for use in recovering the data.

17. The invention of claim 11, wherein each slicer output is based on a specified threshold level.

18. The invention of claim 17, wherein at least one threshold level is dynamically adjusted.

19. The invention of claim 11, wherein the slicers comprise:
    (1) one or more edge slicers, each adapted to slice the received data signal substantially at the prior edge of each symbol interval; and
    (2) one or more center slicers, each adapted to slice the received data signal substantially at the center of each symbol interval.

20. The invention of claim 19, wherein the slicers comprise two edge slicers and three center slicers.

21. The invention of claim 11, wherein at least one of the phase and the frequency of a locally generated clock used to process the received data signal is adjusted based on the edge samples and the center samples.

22. The invention of claim 11, wherein the number of slicer thresholds in the first set is different from the number of slicer thresholds in the second set.

* * * * *